United States Patent [19]

Khouri et al.

[11] Patent Number: 5,691,411
[45] Date of Patent: Nov. 25, 1997

[54] HIGH PERFORMANCE POLYMER COMPOSITIONS

[75] Inventors: Farid Fouad Khouri; John Robert Campbell, both of Clifton Park, N.Y.

[73] Assignee: General Electric Company, Schenectady, N.Y.

[21] Appl. No.: 720,854

[22] Filed: Oct. 2, 1996

Related U.S. Application Data

[63] Continuation of Ser. No. 402,298, Mar. 10, 1995, abandoned.

[51] Int. Cl.$^6$ ................................................ C08L 51/00
[52] U.S. Cl. .......................... 525/64; 525/66; 525/68; 525/69; 525/71; 525/197
[58] Field of Search .................... 525/64, 66, 68, 525/197, 71, 69

[56] References Cited

U.S. PATENT DOCUMENTS

| | | | |
|---|---|---|---|
| 5,132,361 | 7/1992 | Shea et al. | 525/66 |
| 5,153,290 | 10/1992 | Khouri et al. | 526/266 |
| 5,212,255 | 5/1993 | Khouri et al. | 525/391 |
| 5,231,132 | 7/1993 | Khouri | 525/92 |
| 5,247,006 | 9/1993 | Khouri et al. | 524/508 |
| 5,393,833 | 2/1995 | Khouri et al. | 525/64 |

*Primary Examiner*—Mark L. Warzel
*Attorney, Agent, or Firm*—William H. Pittman

[57] ABSTRACT

High performance polymer compositions comprising orthoester or orthocarbonate functionalized olefin polymers and polyphenylene ethers, polyamides or combinations thereof, and the compositions unexpectedly display improved impact resistances and/or decreased delamination.

4 Claims, No Drawings

HIGH PERFORMANCE POLYMER COMPOSITIONS

This application is a Continuation of application Ser. No. 08/402,298 filed Mar. 10, 1995, now abandoned.

FIELD OF THE INVENTION

This invention relates to new compositions of matter. More particularly, the instant invention is directed to novel compositions comprising polymer systems and orthoester and/or orthocarbonate functionalized olefin polymers, and the compositions unexpectedly display high compatibility and no visible delamination when compared to conventional blends.

BACKGROUND OF THE INVENTION

Polyamides and polyethers, for instance, and/or polymer blends which contain polyamides and/or polyphenylene ethers (PPE) constitute an invaluable class of engineering thermoplastic resins. Resins of such are characterized by a unique combination of chemical, physical and electrical properties. For instance, they are resistant to many solvents, generally have high impact strengths. As a result of this unique combination of properties, polyphenylene ether and polyamide resins are suitable for a broad range of commercial applications.

It has been of increasing interest to prepare polymer systems which display improvements in the above-mentioned properties as well as in ductility. This is often achieved by blending polymers with one another. However, resins comprising polyphenylene ethers and/or polyamides are to a large extent incompatible, making them difficult to blend with other polymer systems.

The instant invention, therefore, is directed to novel compositions comprising polymer systems and orthoester and/or orthocarbonate functionalized olefin polymers, and the compositions unexpectedly display high compatibility, no visible delamination, favorable impact resistance and percent elongation and/or increased ductility when compared to conventional blends.

DESCRIPTION OF THE PRIOR ART

Efforts have been disclosed for producing polyphenylene ether composition. In U.S. Pat. No. 5,258,455, polyphenylene ether-olefin polymer compositions are described, wherein said compositions contain acyl group- or electrophilic group-functionalized polyphenylene ethers of high molecular weight, lower molecular weight unfunctionalized polyphenylene ethers and an aliphatic functionalized olefin polymer.

Still others have focused on producing polyphenylene ether resin compositions. In U.S. Pat. No. 4,315,086, compositions comprising polyphenylene ether, polyamide, liquid diene polymers and epoxy compounds are described.

The instant invention is patentably distinguishable from the above-described, since among other reasons, it is directed to novel compositions comprising polymer systems and orthoester and/or orthocarbonate functionalized olefin polymers.

SUMMARY OF THE INVENTION

The instant invention is directed to compositions comprising:

(a) functionalized polymer systems selected from the group consisting of polyphenylene ethers, polyamides and combinations thereof; and (b) olefin polymers having at least one functional moiety selected from the group consisting of orthoesters and orthocarbonates.

DETAILED DESCRIPTION OF THE PREFERRED EMBODIMENTS

Polymer systems, as used throughout, are defined herein to mean polyphenylene ether homopolymers, polyamide homopolymers, copolymers comprising the same and blends comprising the same. Essentially, there is no limitation with respect to the homopolymers, copolymers or blends described above other than that they are capable of forming high performance polymer compositions with the orthoester and/or orthocarbonate functionalized olefin polymers of the instant invention.

There is no limitation with respect to the polyphenylene ethers employed in the instant invention, and both substituted or unsubstituted homopolymers and copolymers of polyphenylene ethers are included. Suitable homopolymers are those containing 2,6-dimethyl-1,4-phenylene ether units and suitable copolymers include random copolymers containing such units in combination with, for example, 2,3,6-trimethyl-1,4-phenylene ether units.

The polyphenylene based ethers of the instant invention are typically prepared by the oxidative coupling of at least one monohydroxyaromatic compound such as 2,6-xylenol or 2,3,6-trimethylphenol. Catalyst systems are generally employed for such coupling; they typically contain at least one transition metal compound such as a copper, manganese or cobalt compound, usually in combination with various other materials.

Furthermore, polyphenylene based ethers suitable for use in the practice of the present invention may be prepared by any of a number of processes utilizing precursor corresponding phenols or derivatives thereof. Examples for their production are disclosed in U.S. Pat. Nos. 3,306,874; 3,306,875; 3,257,357; 3,257,358; 3,337,501; and 3,787,361, all incorporated herein by reference.

Additional useful polyphenylene ethers are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A proportion of the polymer molecules may contain at least one of said aminoalkyl-containing and 4-hydroxybiphenyl end groups.

An example of the overall equation for the production of polyphenylene ethers which are often employed in this invention may be summarized as follows:

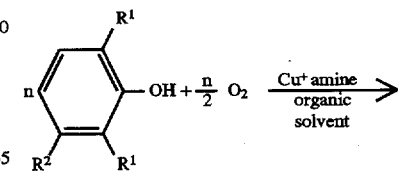

-continued

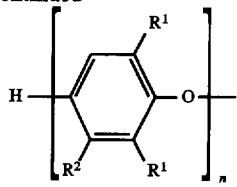

wherein each $R^1$ is independently a hydrogen, $C_{1-10}$ alkyl group, a halohydrocarbon group, a hydrocarbonoxy group or a halohydrocarbonoxy group and $R^2$ is a hydrogen, a $C_{1-10}$ alkyl group, a hydrocarbonoxy group or a halohydrocarbonoxy group. It is often preferred that $R^1$ is a methyl group and $R^2$ is a methyl group or hydrogen. n is an integer often greater than about 5.

The polyphenylene ethers employed in this invention are preferably functionalized in the typical ways known in the art. Such functionalization is not limited and preferably includes, for instance, functionalization with carboxylic acid derivatives, citric acid, maleic anhydride, fumaric acid, epoxides, trimellitic anhydride acid chloride and the like with the proviso that the functionalized polyphenylene ethers are capable of forming a high performance polymer composition with the orthoester functionalized olefin polymers. Moreover, it is also within the scope of the instant invention to employ polyphenylene ethers that have been functionalized via oxidation with molecular oxygen. Such oxidation is achieved by heating unoxidized polyphenylene ether in a circulating air oven at about 100° to 200° C.; for instance, by a method similar to the one described in *Polymer Degradation and Stability* 44 (1994), pp. 119–126.

The polyamides typically employed in this invention are obtained, for instance, by polymerizing a monoamine-monocarboxylic acid; or a lactam thereof having at least 2 carbon atoms between the amino and carboxylic acid group or by polymerizing substantially equimolar proportions of a diamine which contains at least 2 carbon atom between the amino groups and a dicarboxylic acid; or by polymerizing a monoaminocarboxylic acid or a lactam thereof as defined hereinabove together with substantially equimolar proportions of a diamine and a dicarboxylic acid. The dicarboxylic acid in the form of a functional derivative thereof is, for example, an ester or acid chloride.

The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoaminomonocarboxylic acids or lactams thereof which are useful in preparing the polyamides include those compounds containing from 2 to 16 carbon atoms between the amino and carboxylic acid groups, said carbon atoms forming a ring with the -CO-NH-group in the case of a lactam. As particular examples of aminocarboxylic acids and lactams there may be mentioned aminocaproic acid, butyrolactam, pivalolactam, capro lactam, capryl-lactam, enantholactam, undecanolactam, dodecanolactam and 3- and 4-aminobenzoic acids.

Diamines suitable for use in the preparation of the polyamides include straight chain and branched, alkyl, aryl and alkylaryl diamines. Such diamines include, for example, those represented by the general formula $$H_2N(CH_2)_nNH_2,\quad \text{I}$$

wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, meta-xylene diamine and the like.

The dicarboxylic acids may be aromatic, for example, isophthalic and terephthalic acids. Preferred dicarboxylic acids are of the formula $$HOOC-Y-COOH,\quad \text{II}$$

wherein Y represents a divalent aliphatic group containing at least 2 carbon atoms, and examples of such acids are sebacic acid, octadecanedoic acid, suberic acid, glutaric acid, pimelic acid and adipic acid.

Typical examples of polyamides (Nylons) useful in the instant invention include for example polyamides 4/6, 6, 6/6, 11, 12, 6/3, 6/4, 6/10 and 6/12 as well as polyamides resulting from terephthalic acid and/or isophthalic acid and trimethyl hexamethylene diamine, polyamides resulting from adipic acid and meta xylylenediamines, polyamides resulting from adipic acid, azelaic acid and 2,2-bis-(p-aminocyclohexyl)propane, semi-crystalline polyamides resulting from combinations of terephthalic and/or isophthalic and/or adipic acids with hexamethylene diamine, semi-crystalline polyamides resulting from terephthalic and/or isophthalic acids and hexamethylene and 2-methyl pentamethylene diamines, and polyamides resulting from terephthalic acid and 4,4'-diamino-dicyclohexylmethane. Mixtures and/or copolymers of two or more of the foregoing polyamides or prepolymers, respectively, are also within the scope of the present invention. Preferred polyamides are the polyamides 6, 6/6, 6/10 and 4/6, most preferably polyamide 6/6.

It is also understood that use of the term "polyamides" herein and in the appended claims is intended to include the toughened or super tough polyamides. Super tough polyamides or super tough nylons, as they are more commonly known, are available commercially, e.g., from E.I. duPont under the tradename Zytel ST, or may be prepared in accordance with a number of U.S. patents, including, among others, Epstein, U.S. Pat. No. 4,174,358; Novak, U.S. Pat. No. 4,474,927; Roura, U.S. Pat. No. 4,346,194; and Joffrion, U.S. Pat. No. 4,251,644, herein incorporated by reference. These super tough nylons are prepared by blending one or more polyamides with one or more polymeric or copolymeric elastomeric toughening agents. Suitable toughening agents are disclosed in the above-identified U.S. patents, as well as in Caywood, Jr., U.S. Pat. No. 3,884,882 and Swiger, U.S. Pat. No. 4,147,740 and Gallucci et al., "Preparation and Reactions of Epoxy-Modified Polyethylene", *J. Appl. Poly. Sci.*, Vol. 27, pp. 425–437 (1982) herein incorporated by reference. Typically, these elastomeric polymers and copolymers may be straight chain or branched as well as graft polymers and copolymers, including core-shell graft copolymers, and are characterized as having incorporated therein either by copolymerization or by grafting on the performed polymer, a monomer having functional and/or active or highly polar groupings capable of interacting with or adhering to the polyamide matrix so as to enhance the toughness of the polyamide polymer.

Combinations of polyphenylene ethers and polyamides include, for instance, systems comprising the same and prepared by any conventional method satisfactorily employed in the art. Generally, however, melt blending methods are desired. A more detailed and typical description of the production of polyphenylene ether/polyamide polymer systems that may be employed in this invention is described in U.S. Pat. No. 4,873,286, the disclosure of which is incorporated herein by reference.

The orthoester and/or orthocarbonate functionalized olefin polymers employed in this invention include, for instance, ethylene propylene diene comonomer (EPDM) rubbers and derivatives thereof as well as ethylene alkene rubbers such as poly(ethylene-copropylene) polydiene rubbers such as polybutadiene and polyacrylates such as poly (butylacrylate). Such functionalized olefin polymers often comprise and preferably consist essentially of and most preferably consist of;

(a) at least one block or random polymer having present in its backbone units of the formulae

    III and

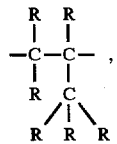    IV with or without units of the formula

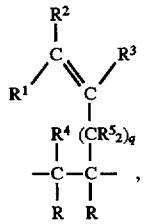    V wherein:

(a) each R is independently a hydrogen, $C_{1-5}$ alkyl group or halogen and preferably hydrogen;

(b) R* is a hydrogen, $C_{1-5}$ alkyl group or halogen;

(c) $R^1$, $R^2$, $R^3$, $R^4$ and $R^5$ are each independently a hydrogen, $C_{1-5}$ alkyl group or halogen or $R^1$ or $R^2$ and $R^3$ together with atoms connecting them can form a 4 to 10 membered cyclic or bicyclic ring or $R^1$ or $R^2$ and $R^4$ together with atoms connecting them can form a 4 to 10 membered cyclic or bicyclic ring or one $R^5$ and $R^1$ together with atoms connecting them can form a cyclic or bicyclic ring;

(d) q is 0 to 2, with the proviso that when q is 0 and formula V is present the compositions may further comprise or consist essentially of units of the formula

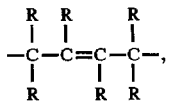    VI wherein R is as previously defined; and (b) structural units grafted thereon having the formula

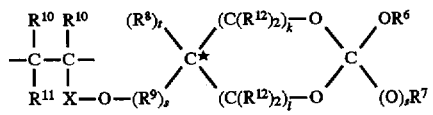    VII wherein $R^6$ is a $C_{1-10}$ primary or secondary alkyl or aralkyl or a $C_{6-10}$ aromatic radical or an alkylene radical forming a second 4 to 8 membered ring with C* thus producing a bicyclo compound. $R^7$ is a $C_{1-10}$ primary or secondary alkyl or aralkyl or a $C_{6-10}$ aromatic radical or $R^6$ and $R^7$ taken together with atoms connecting them can form a 4 to 8 membered ring thus producing a spirocyclo compound. $R^8$ is a hydrogen, alkyl or aryl and $R^9$ is a $C_{1-6}$ alkylene radical. k is an integer from 0 to 2 and I is an integer from 0 to 1. s is 0 or 1 and t is 0 when $R^6$ and C* form a bicyclo compound and is otherwise 1 and each $R^{10}$ is individually a hydrogen or methyl and $R^{11}$ is hydrogen, $C_{1-6}$ alkyl group or a $C_{6-10}$ aromatic radical and each $R^{12}$ is independently a hydrogen, $C_{1-5}$ hydrocarbon, substituted or unsubstituted aromatic radical or a halogen and X is a substantially inert linking group.

The orthoester and/or orthocarbonate functionalized olefin polymers described in this invention may be prepared, for instance, by first reacting a hydroxy substituted precursor of formula VII with a suitable reagent such as acryloyl chloride or a vinyl benzylchloride or benzoylchloride and subsequently extruding the resulting ethylenically unsaturated orthoester with olefin polymers. The first reaction typically occurs in the presence of tertiary amines or alkaline reagents, depending upon the reagents used. A detailed description for the production of said functionalized olefin polymers may be found in U.S. Pat. No. 5,153,290, the disclosure of which is incorporated herein by reference.

It is further within the scope of the instant invention to include any additives/fillers that are typically employed in polymer systems comprising polyphenylene ethers and polyamides. Such additives/fillers include, for instance, glass fibers, ultraviolet light screeners, thermal stabilizers and impact modifiers. The often preferred impact modifiers include, for example, those comprising diblock and triblock copolymers and core-shell graff copolymers of alkenylaromatic and diene compounds, and especially those comprising styrene, butadiene or isoprene blocks.

Moreover, there is no limitation with respect to the percent of formulae III, IV, V, VI and VII present in the compositions of this invention other than that when formula VI is present, the composition may comprise from about 50% to about 80% formula VI based on total weight of formula V and VI in the composition. Preferably, however, the ratio of formulae III:IV is often about 1:9 to about 9:1 and most preferably about 2:1 and the ratio of mono olefin derivatives:diene derivatives is often about 1:50 to about 50:1 and most preferably about 20:1.

The high performance polymer compositions of this invention may be prepared, for example, by extruding the functionalized olefin polymers and polymer systems in an extruder having zone temperatures from about 200° to 450° C. The resulting extrudate is often cooled in a water bath, pelletized and dried in order to obtain the desired high performance polymer compositions. Additionally, it is noted herein, that it is within the scope of the instant invention to prepare the high performance compositions by a method which comprises the steps of:

(a) precompounding functionalized polyphenylene ethers with functionalized olefin polymers; and (b) subsequently adding polyamides thereto.

The following examples further illustrate and facilitate an understanding of the instant invention. The products obtained may be confirmed by conventional techniques such as Transmission Electron Microscopy or Scanning Electron Microscopy.

EXAMPLE 1

A 5-liter 3-necked flask fitted with a mechanical stirrer pressure equalizing addition funnel and nitrogen inlet was charged with 301 grams (2.03 moles) of 4-hydroxymethyl-2-methoxy-2-methyl-1,3-dioxolane, 514 grams (5.08 moles) of triethylamine and 2 liters of methylene chloride. The flask was immersed in an ice-water bath and 193.1 grams (2.13 moles) of acryloyl chloride was added over 50 minutes under nitrogen, with stirring. The mixture was stirred at room temperature overnight, a precipitated solid was filtered and the resulting filtrate was washed twice with 2-liter portions of water, dried over magnesium sulfate, filtered and vacuum stripped. A free radical inhibitor, 3-t-butyl-4-hydroxy-5-methylphenyl sulfide, was added in the amount of 200 ppm. to the residue which was then distilled under vacuum. The desired ethylenically unsaturated orthoester, 4-acryloyloxymethyl-2-methoxy-2-methyl-1,3-dioxolane, was recovered by distillation at 80°–85° C./0.5–1.0 torr.

EXAMPLE 2

The procedure of Example 1 was repeated employing 281 grams (1.9 moles) of 4-hydroxymethyl-2-methoxy-2-methyl-1,3-dioxolane, 481 grams (4.76 moles) of triethylamine and 199 grams (1.9 moles) of methacryloyl chloride. The ethylenically unsaturated orthoester, 4-methacryloyloxymethyl-2-methoxy-2-methyl-1,3-dioxolane, was collected at 80° C./0.4 torr.

EXAMPLE 3

The procedure of Example 1 was repeated employing 21 grams (100 mmol.) of 4-hydroxymethyl-2-methoxy-2-phenyl-1,3-dioxolane, 25.3 grams (250 mmol.) of triethylamine, 9.5 grams (105 mmol.) of acryloyl chloride and 150 ml. of methylene chloride. The crude product was purified by column chromatography over basic alumina, using 15% (by volume) ethyl acetate in hexane as an eluant, to yield the desired ethylenically unsaturated orthoester, 4-acryloyloxymethyl-2-methoxy-2-phenyl-1,3-dioxolane.

EXAMPLE 4

A 4-necked 250-ml. round-bottomed flask equipped with a mechanical stirrer, a pressure equalizing addition funnel, a condenser and a thermometer was charged with 51.9 grams (350 ml.) of 4-hydroxymethyl-2-methoxy-2-methyl-1,3-dioxolane and 14.01 grams (350 mmol.) of powdered sodium hydroxide. The slurry was stirred for 15 minutes under nitrogen after which 41.1 grams (270 mmol.) of vinylbenzyl chloride (isomeric mixture) was added dropwise over 10 minutes. The mixture was heated to 80° C. whereupon an exothermic reaction took place which caused the temperature to rise to 140° C. The mixture was stirred overnight under nitrogen, diluted with 400 ml. of methylene chloride and 5 ml. of triethylamine and washed twice with 250 ml. of aqueous sodium chloride solution. The organic layer was dried over magnesium sulfate, filtered and vacuum stripped and the residue was purified by column chromatography over basic alumina using a 2:1 (by volume) mixture of hexane and methylene chloride was eluant. There was obtained the desired isomeric mixture of 4-(2-methoxy-2-methyl-1,3-dioxolanyl)methyl vinylbenzyl ethers.

EXAMPLES 5–9

Mixtures of various ethylenically unsaturated orthoesters (as prepared in Examples 1–4) and 1 gram of 2,5-dimethyl-2,5-di(t-butylperoxy)hexane were premixed and combined with 1 kilogram of a commercially available EPDM copolymer containing about 83 mole percent ethylene and about 5.4 mole percent norbornene units. The blends were stored for about 16 hours at 20° C. to enable the orthoester and polymerization initiator to be completely absorbed by the EPDM pellets and were then extruded on a twin-screw extruder with zone set temperatures ranging from 120° to 205° C. The extrudates were cooled in a water bath, pelletized and dried in vacuum.

The proportion of the ethylenically unsaturated orthoester grafted on the EPDM copolymer was determined by dissolving a sample of the graft copolymer in xylene at about 130° C., pouring the resulting solution into acetone and filtering and drying the purified copolymer, which was then analyzed by Fourier transform infrared spectroscopy. Gel content was determined by continuous extraction with hot xylene for 48 hours followed by drying and weighing of the insoluble residue. The results are given in Table I, with all percentages being by weight.

TABLE I

| | Example | | | | |
|---|---|---|---|---|---|
| | 5 | 6 | 7 | 8 | 9 |
| Orthoester: | | | | | |
| Example | 1 | 1 | 1 | 2 | 3 |
| Percent based on EPDM copolymer | 0.3 | 1.0 | 3.0 | 1.0 | 1.3 |
| Amount grafted, % | >99 | >90 | >90 | 50 | — |
| Gel, % | 0 | 40 | 40 | 0 | — |

EXAMPLE 10

Ethylenically functionalized EPDM copolymers (1 part) as prepared in Example 5 and oxidized polyphenylene ether (9 parts) were fed to a twin screw extruder operating at 400 rpm with zone temperatures of 149°, 204°, 302°, 302° and 302° C. and a die temperature of 304° C. The resulting extrudate was cooled in a water bath, pelletized and dried at 120° C. for 3 hours. Dry pellets were molded into Izod and tensile bars on a 15 ton injection molder with barrel and mold temperatures of 320° and 80° C. respectively and injection pressure of 1000–1200 psi. Notched Izod and percent tensile elongation of the resulting high performance polymer composition were run following ASTM D-648 and ASTM D-638 test procedures respectively and the former measured 7.6 ft-lbs/in and the latter measured 187%.

EXAMPLE 11

Example 11 was run in a manner similar to the one described in Example 10 except that citric acid functionalized (2%) polyphenylene ether was employed. The resulting high performance polymer composition had a Notched Izod of 8.0 and a percent tensile elongation of 176.

EXAMPLE 12

Example 12 was run in a manner similar to the one described in Example 11 except that 15 parts of functionalized EPDM were precompounded with 37 parts of fumaric acid functionalized (0.8%) polyphenylene ether and subsequently compounded with 48 parts of polyamide (Nylon 6/6). The resulting high performance polymer composition had a Notched Izod of 15.2 ft-lb/in.

The data in Table II is provided to demonstrate the unexpected and superior properties obtained in the instant invention. All entries have been prepared in a manner similar to those described in the examples provided above.

TABLE II

| Entry | Polyphenylene[a] ether | Polyolefin[b] | Notched Izod (ft-lb/in) | Elongation % | Modulus (kpsi) | Visible[s] Delamination |
|---|---|---|---|---|---|---|
| 1 | U | EPDM | 8.3 | 193 | 98.6 | Severe |
| 2 | O | EPDM | 8.7 | 184 | 97.2 | Severe |
| 3 | U | EPDM[1] | 7.9 | 212 | 93.0 | Severe |
| 4 | O | EPDM[2] | 8.3 | 212 | 94.4 | Yes |
| 5 | O | EPDM[3] | 8.3 | 181 | 97.8 | Yes |

TABLE II-continued

| Entry | Poly-phenylene[a] ether | Poly-olefin[b] | Notched Izod (ft-lb/in) | Elonga- tion % | Modulus (kpsi) | Visible[g] Delam- ination |
|---|---|---|---|---|---|---|
| 6 | O | EPDM[4] | 7.6 | 187 | 95.3 | Slight |
| 7 | CA | EPDM[4] | 7.14 | 178 | 93.3 | None |
| 8 | FA | EPDM[1] | 8.0 | 176 | 95.6 | None |
| 9 | FA | EPDM[2] | 8.3 | 174 | 97.6 | None |
| 10[c] | FA | EPDM | 0.77 | — | — | Und. |
| 11[d] | FA | EPDM[1] | 2.92 | — | — | Und. |
| 12[e] | FA | EPDM[1] | 15.2 | — | — | Und. |
| 13[f] | FA | EPDM[1] | 2.92 | — | — | Und. |

U = unfunctionalized; O = functionalized via oxidation; CA = citric acid functionalized (2.0%); FA = fumaric acid functionalized (0.8%).
1 = functionalized with 1% orthoester; 2 = functionalized with 3% glycidyl acrylate; 3 = functionalized with 3% glycidyl methacrylate; 4 = functionalized with 2% orthoester.
[a] = 90% polyphenylene ether by weight
[b] = 10% polyolefin by weight
[c] = 48 parts Nylon 6,6; polyether and EPDM precompounded
[d] = 48 parts Nylon 6,6; no precompounding
[e] = 48 parts Nylon 6,6; polyether and EPDM precompounded
[f] = 41 parts Nylon 6,6; polyether and EPDM precompounded
[g] = based on visual examination
und. = undetectable in compositions comprising polyamide (Nylon 6,6)

What is claimed is:

1. A method for making high performance compositions comprising the steps of:

(a) precompounding carboxylic acid, maleic anhydride, epoxide, trimellitic anhydride acid chloride or molecular oxygen functionalized polyphenylene ethers with orthoester or orthocarbonate functionalized olefin polymers; and (b) subsequently adding polyamides thereto.

2. A method in accordance with claim 1 wherein said polyphenylene ethers are homopolymers comprising 2,6-dimethyl-1,4-phenylene ether units or 2,3,6-trimethyl-1,4-phenylene ether units or copolymers comprising the same and said functionalized olefin polymers are orthoester or orthocarbonate functionalized EPDM copolymers.

3. A method in accordance with claim 1 wherein said polyamide is Nylon 6/6.

4. A high performance polymer composition prepared by the method of claim 1.

* * * * *